SIGISMUND BEER, OF NEW YORK, N. Y.

Letters Patent No. 84,471, dated December 1, 1868.

IPROVED PROCESS OF RECOVERING AND REWORKING BORAX FROM SOLUTIONS USED IN TREATING WOOD.

The Schedule referred to in these Letters Patent and making part of the same.

*To all whom it may concern:*

Be it known that I, SIGISMUND BEER, of the city, county, and State of New York, have discovered a new and useful Process for Reworking the Liquids Used in Beerizing, Seasoning, or Preserving Wood, by the process described in the Letters Patent of the United States to me, No. 73,565, dated January 21, 1868; and I hereby declare that the following is a full, clear, and exact description thereof.

Heretofore the solutions of borax charged with albuminous matter were evaporated to dryness, then heated to charring, and afterwards treated with hot water, in order to get rid of the organic matter and regain the borax. It is evident that such operation is at least tedious and complicated.

My discovery consists in freeing the liquids from the organic matters by precipitation, so that I am enabled to use the liquids directly over, and also to use the large quantities of precipitated albumen, for manuring, manufacturing, or other purposes.

The process and operation are as follows:

When the lumber has been boiled and sufficiently impregnated, in a solution of borax or of a like compound, and the liquid drawn off therefrom, and has become cool, it is intimately mixed with a small quantity of a solution of alum, just sufficient to acidify the liquid, and to change the blue color of litmus paper into red. The albuminous matter will then begin to settle down to the bottom, and after several hours the clear liquid is to be drawn off, and alkalinized with soda sufficiently to turn red litmus paper blue. It is then ready to use, with or without an addition of borax.

Instead of alum, any other metallic salt or mineral acid, or an infusion of gall-nuts or like substances, will produce like precipitations; but I prefer alum, because it is the cheapest and most effective substance for this purpose, and because an excess is comparatively harmless.

The albuminous precipitate may be washed out, or otherwise prepared for use, for any purposes in which albumen is serviceable.

What I claim, and desire to secure by Letters Patent, is—

Utilizing the liquids employed in the process of Beerizing, seasoning, or preserving wood by precipitation, substantially as and for the purposes specified.

SIGISMUND BEER.

Witnesses:
GEO. H. COLLINS,
THOS. J. BALDWIN.